United States Patent
Buchholz et al.

(10) Patent No.: US 10,399,161 B2
(45) Date of Patent: Sep. 3, 2019

(54) METHOD AND DEVICE FOR PRODUCING A GEARING IN WORKPIECE GEARS BY MEANS OF SKIVING

(71) Applicant: Profilator GmbH & Co. KG, Wuppertal (DE)

(72) Inventors: Klaus Buchholz, Wuppertal (DE); Wolfgang Heinemann, Remscheid (DE)

(73) Assignee: Profilator GmbH & Co. KG, Wuppertal (DE)

( * ) Notice: Subject to any disclaimer, the term of this patent is extended or adjusted under 35 U.S.C. 154(b) by 51 days.

(21) Appl. No.: 15/561,455

(22) PCT Filed: Mar. 8, 2016

(86) PCT No.: PCT/EP2016/054842
§ 371 (c)(1),
(2) Date: Sep. 25, 2017

(87) PCT Pub. No.: WO2016/150691
PCT Pub. Date: Sep. 29, 2016

(65) Prior Publication Data
US 2018/0117691 A1   May 3, 2018

(30) Foreign Application Priority Data
Mar. 25, 2015   (DE) .................. 10 2015 104 500

(51) Int. Cl.
*B23F 21/00* (2006.01)
*B23F 5/16* (2006.01)
*B23C 5/02* (2006.01)

(52) U.S. Cl.
CPC ............ *B23F 5/163* (2013.01); *B23F 21/005* (2013.01); *B23C 5/02* (2013.01); *Y10T 409/105088* (2015.01)

(58) Field of Classification Search
CPC .... B23C 5/02; B23F 1/06; B23F 5/163; B23F 9/10; B23F 9/105; B23F 9/12;
(Continued)

(56) References Cited

U.S. PATENT DOCUMENTS 1,940,703 A * 12/1933 Stewart ..................... B23F 1/06
409/55
1,998,835 A * 4/1935 Fellows ................... B23F 5/166
409/35
(Continued)

FOREIGN PATENT DOCUMENTS

DE        2654177 A1      6/1978
DE        3915976 A1      11/1990
(Continued)

OTHER PUBLICATIONS

PCT International Search Report & Written Opinion Application No. PCT/EP2016/054842 Completed Date: May 27, 2016; dated Jun. 7, 2016 11 Pages.
(Continued)

*Primary Examiner* — Nicole N Ramos
(74) *Attorney, Agent, or Firm* — Whitmyer IP Group LLC

(57) ABSTRACT

A method and a device for gear cutting a work wheel includes a cutting wheel with cutting teeth, which is rotatably driven on a tool spindle about a tool spindle axis. The cutting teeth engage into the work wheel, which is rotatably driven on a workpiece spindle about a workpiece axis that intersects the tool spindle axis. In rough cuts, tooth spaces between left and right tooth flanks of teeth of the toothing are deepened via a change in axial distance of the tool spindle axis and the workpiece axis. In a first finishing cut, only the left tooth flank is precision machined with a chip removal point moving from top to base of the tooth with gear skiving movement. In a second finishing cut, only the right tooth flank is precision machined with a chip removal point
(Continued)

moving from top to base of the tooth with gear skiving movement.

13 Claims, 6 Drawing Sheets

(58) Field of Classification Search
CPC ........ B23F 21/22; B23F 21/223; B23F 21/04; B23F 21/046; Y10T 409/103816; Y10T 409/103975; Y10T 409/104134; Y10T 409/104293; Y10T 409/10477; Y10T 409/105088; Y10T 409/105124; Y10T 109/106201; Y10T 409/106837
See application file for complete search history.

(56) References Cited

U.S. PATENT DOCUMENTS

| | | | | |
|---|---|---|---|---|
| 2,282,193 A * | 5/1942 | Lambrix | ................. | B23F 5/166 409/60 |
| 2,330,168 A * | 9/1943 | Zimmermann | ......... | B23F 23/12 409/11 |
| 3,931,754 A * | 1/1976 | Nishijima | ............... | B23F 5/163 409/35 |
| 4,534,684 A * | 8/1985 | Johnson | .................... | B23F 3/00 409/26 |
| 2011/0164931 A1 * | 7/2011 | Ono | ...................... | B23F 21/226 407/22 |
| 2012/0027531 A1 * | 2/2012 | Kreh | ....................... | B23F 9/105 409/26 |
| 2012/0076598 A1 * | 3/2012 | Bender | ..................... | B23F 1/06 409/55 |
| 2012/0282055 A1 * | 11/2012 | Marx | ..................... | B23F 5/163 409/37 |
| 2013/0071197 A1 * | 3/2013 | Marx | ..................... | B23F 5/163 409/33 |

FOREIGN PATENT DOCUMENTS

| | | |
|---|---|---|
| DE | 102008037514 A1 | 5/2010 |
| DE | 102013109981 A1 | 1/2015 |
| EP | 2570217 A1 | 3/2013 |
| EP | 2596893 A1 | 5/2013 |
| EP | 2385885 A1 | 11/2016 |
| WO | 2014034495 A1 | 3/2014 |

OTHER PUBLICATIONS

Translation of International Search Report Application No. PCT/EP2016/054842 Completed Date: May 27, 2016; dated Jun. 7, 2016 3 Pages.

* cited by examiner

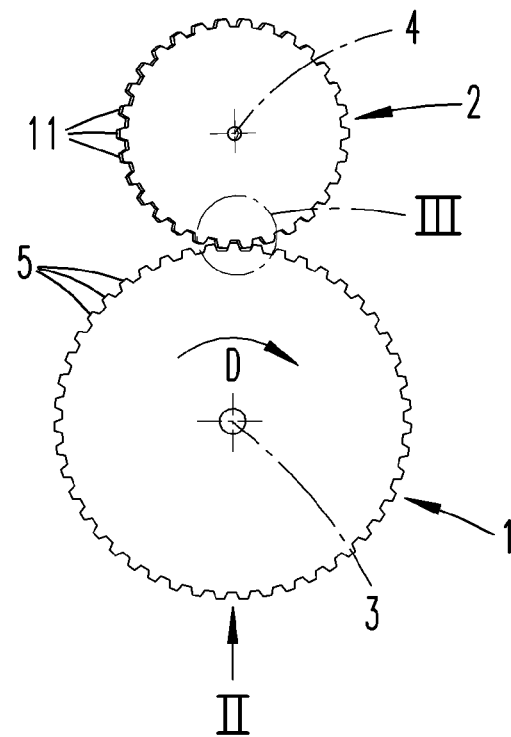
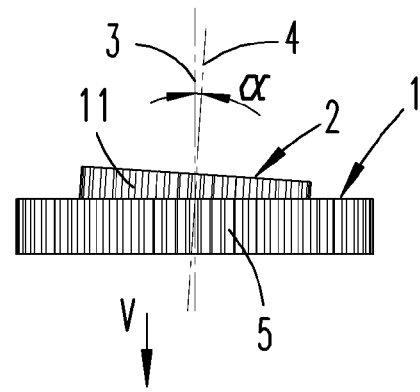
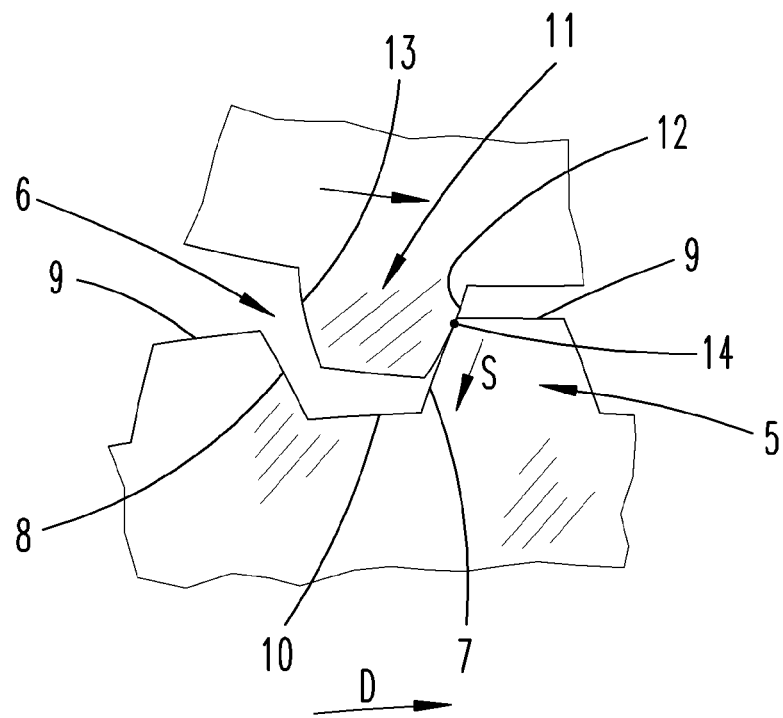

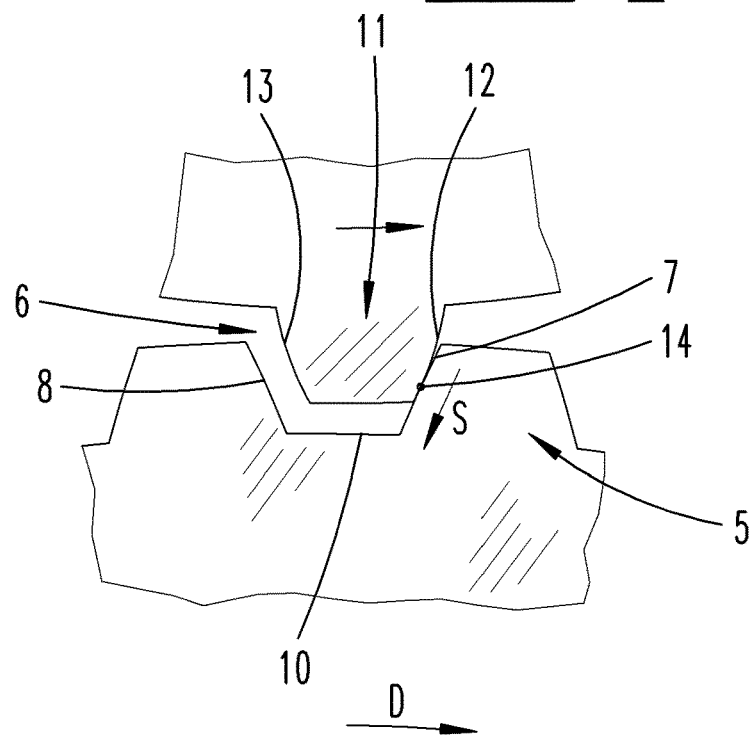
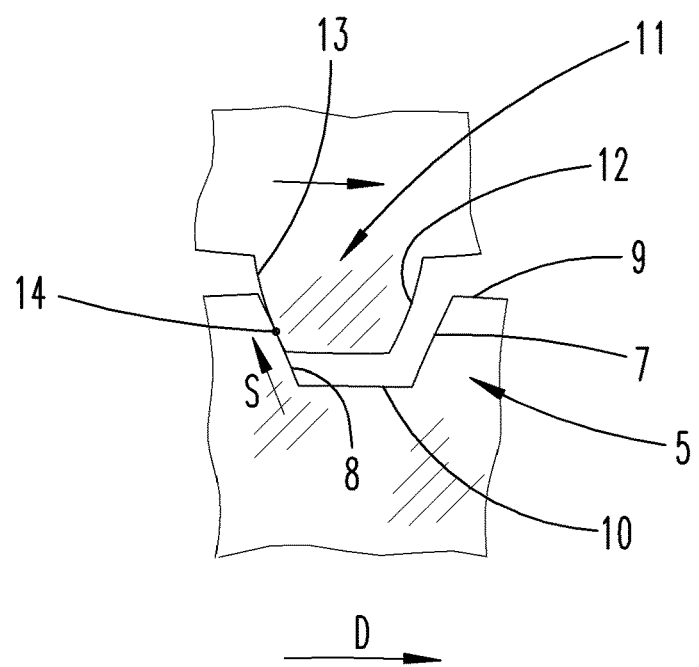

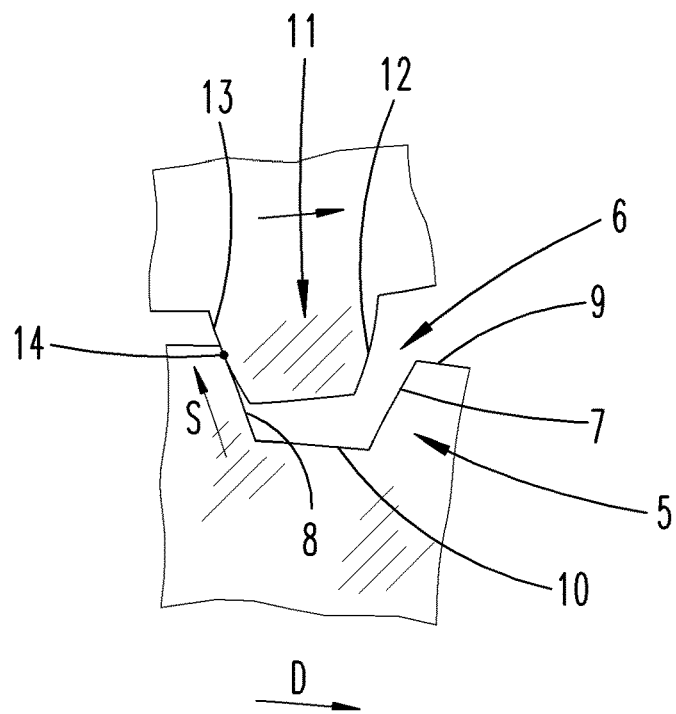
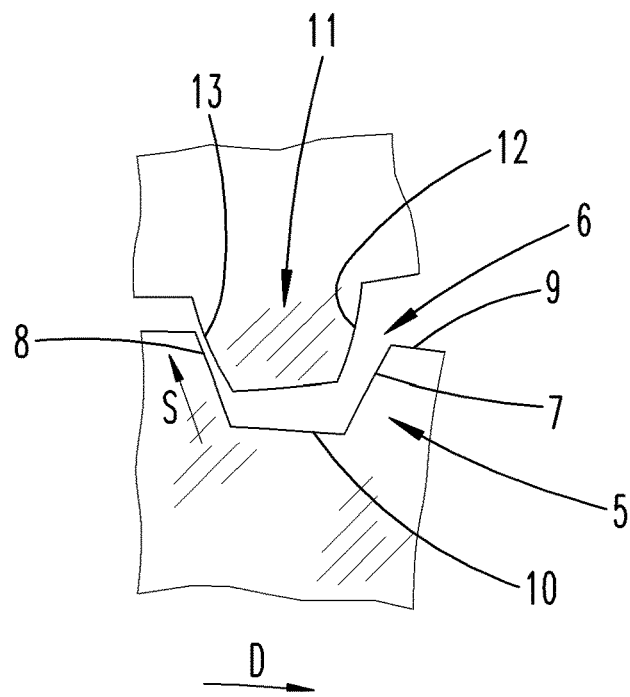

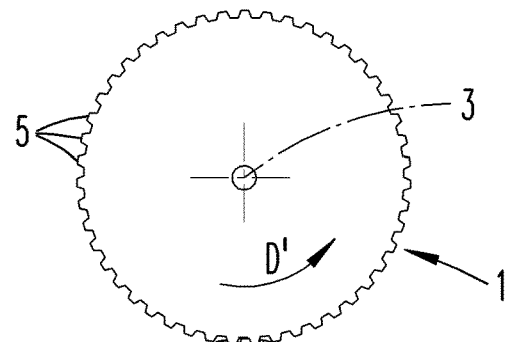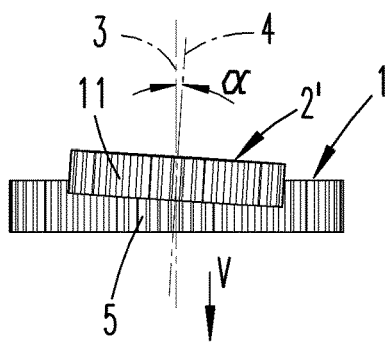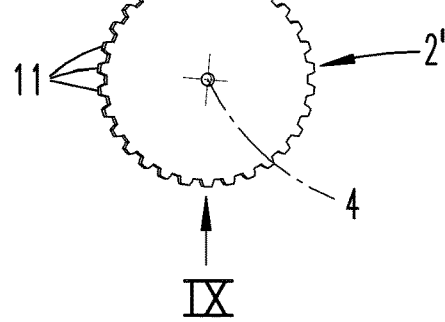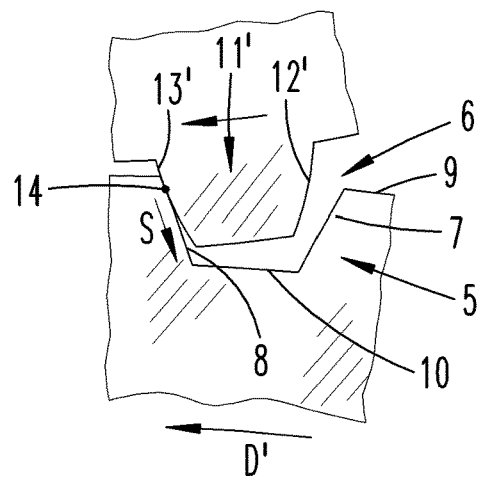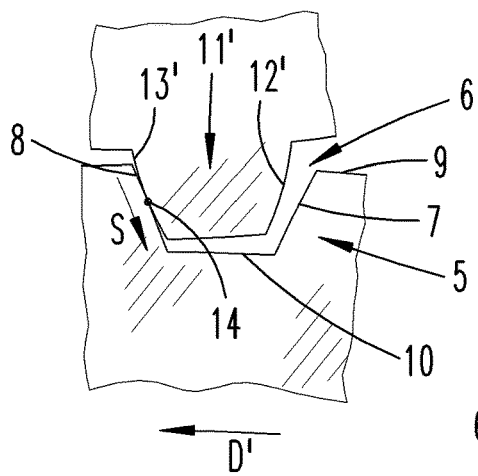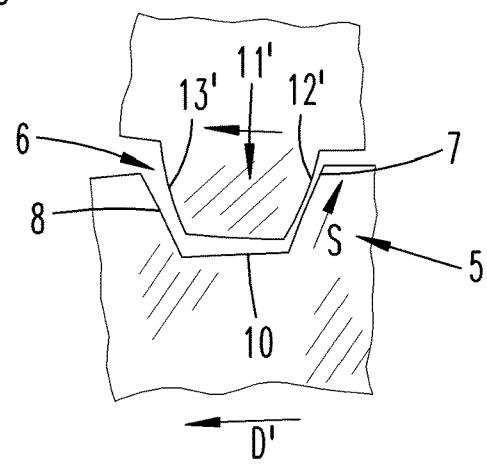

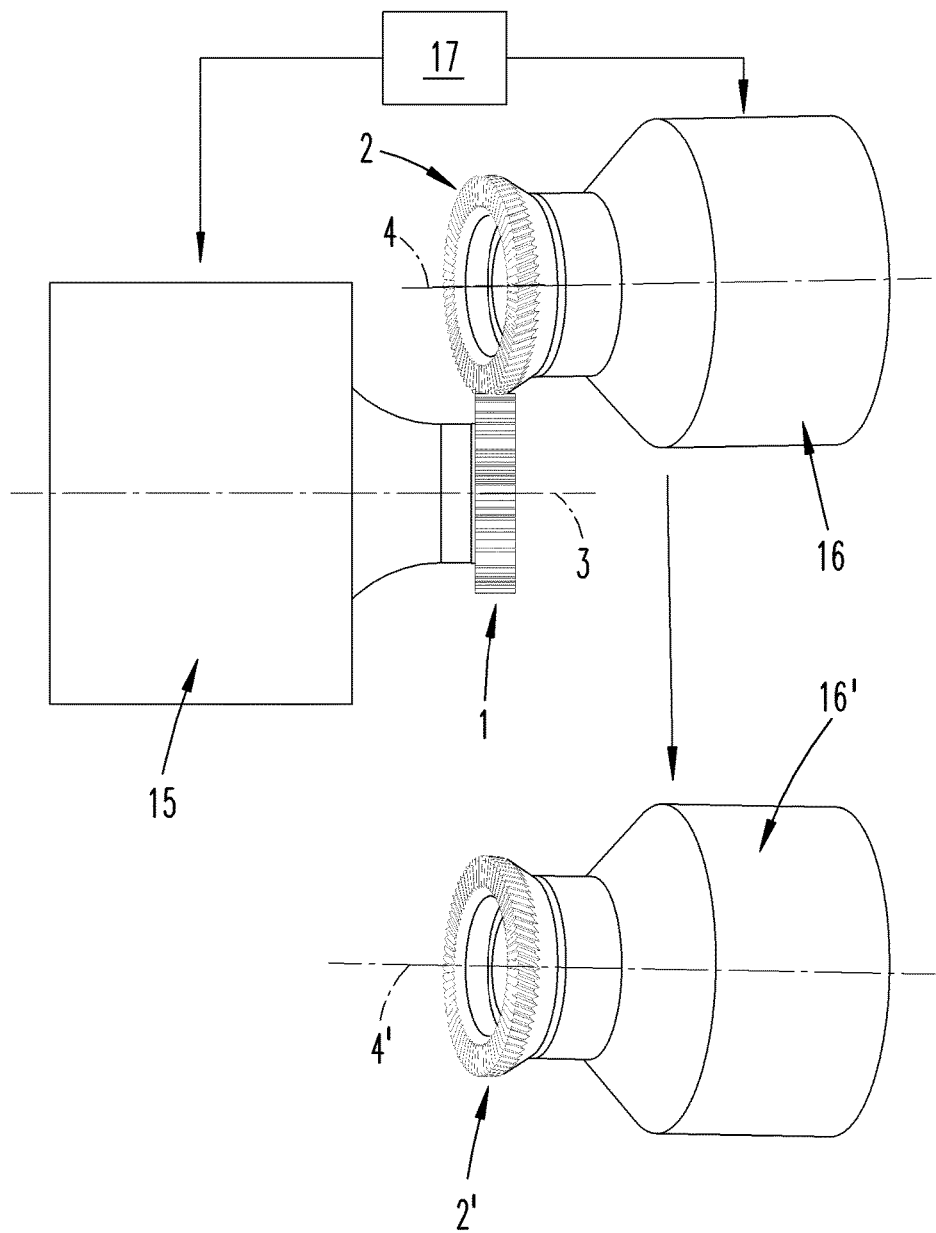

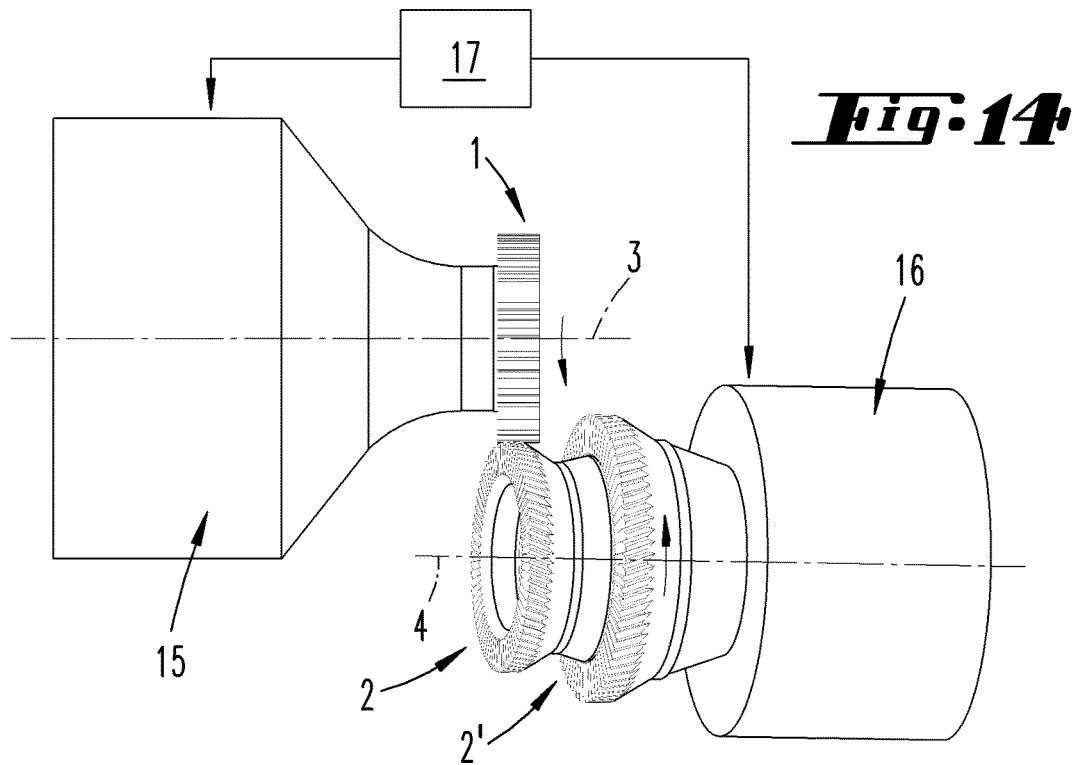
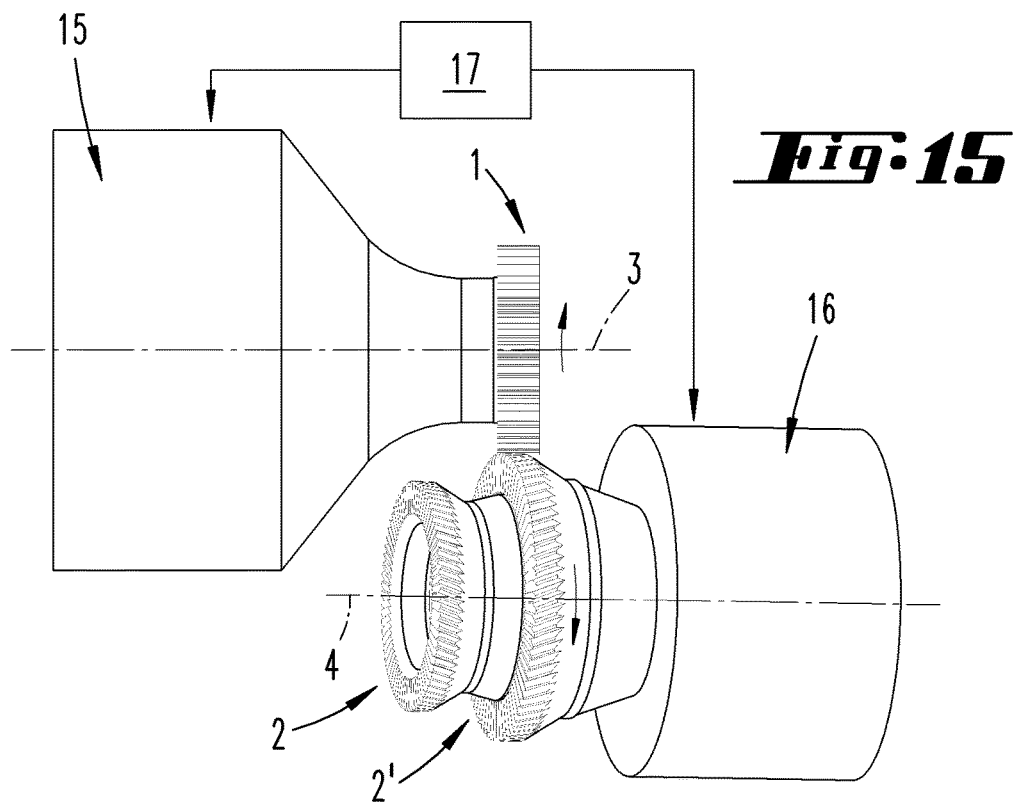

METHOD AND DEVICE FOR PRODUCING A GEARING IN WORKPIECE GEARS BY MEANS OF SKIVING

TECHNICAL FIELD

The invention pertains to a method for producing a gearing in a workpiece gear by means of skiving, in which a first cutting wheel, which is seated on a first tool spindle and features first cutting teeth, is rotationally driven about a first tool spindle axis and the cutting teeth engage into the workpiece gear, which is carried by a workpiece spindle and rotationally driven about a workpiece axis that is aligned at an axial intersection angle to the tool spindle axis, in a machining fashion during an advance in the direction, in which the teeth of the gearing extend, wherein the tooth gaps between left and right flanks of the teeth of the gearing are deepened during several successive rough cuts by changing the axial clearance between the tool spindle axis and the workpiece spindle axis, and wherein subsequently only the left tooth flanks are during a first finishing cut machined at a machining point, which migrates from the tip of the tooth to the root of the tooth while the skiving motion takes place, and only the right tooth flanks are during a second finishing cut machined at a machining point, which migrates from the tip of the tooth to the root of the tooth while the skiving motion takes place. The invention furthermore pertains to a device for producing a gearing in a workpiece gear by means of skiving, wherein said device features a tool spindle, on which a first cutting wheel with first cutting teeth is seated and can be rotationally driven about a tool spindle axis, a workpiece spindle, which carries the workpiece gear and can be rotationally driven about a workpiece axis that is aligned at an axial intersection angle to the tool spindle axis, and a control unit, by means of which the workpiece spindle, the tool spindle and an advancing unit can be controlled in such a way that the cutting teeth engage into the workpiece gear being advanced in the direction, in which the teeth extend, in a machining fashion, wherein the tooth gaps between left and right flanks of the teeth of the gearing are deepened during several successive rough cuts by preferably changing the axial clearance between the tool spindle axis and the workpiece spindle axis, and wherein the left and right tooth flanks are subsequently precision-machined with finishing cuts.

BACKGROUND

EP 2 596 893 A1 describes a skiving method, in which a rough gearing is initially produced during several rough cuts by means of a cutting wheel that features cutting teeth. The cutting teeth have a trapezoidal cross section such that only the left tooth flanks and only the right tooth flanks can be respectively machined during two successive finishing cuts. For this purpose, the rotating directions of the tool spindle and the workpiece spindle are reversed and the axial intersection angle is changed.

DE 10 2008 037 514 A1 discloses a device with spindle drives and positioning drives that are driven by an electronic control unit in a program-controlled fashion. The positioning drives and the spindle drives are formed by electric motors. A tool in the form of a cutting wheel with radially protruding teeth is rotationally driven in a continuous fashion while gearings are produced in workpieces by means of skiving. The workpiece, which may consist of a non-geared or pre-geared blank, is driven by a workpiece spindle with a predefined speed ratio such that the cutting teeth of the tool engage into the workpiece to be provided with a gearing in a rolling fashion. Due to the axial intersection angle, the cutting teeth engage into the workpiece in a skiving fashion such that a machining point in the plane of rotation initially machines the left tooth flank in an inwardly rolling fashion, i.e. from the tip of the tooth to the root of the tooth, and subsequently the opposite right tooth flank in an outwardly rolling fashion, i.e. from the root of the tooth to the tip of the tooth. A migrating motion of the machining point in the axial direction of the workpiece gear or in the direction, in which the flanks of the teeth of the workpiece gear extend, is superimposed on the migration of the machining point in the plane of rotation of the cutting wheel. In this case, the advance takes place essentially in the same direction, namely in the axial direction when producing spur-geared workpiece gears and at an angle thereto, namely in the direction, in which the tooth flanks extend, when producing helically geared workpiece gears. In the known skiving method, the gearing is produced in several successive skiving steps, wherein the advance essentially remains constant, but the axial clearance is adjusted between the individual machining steps such that the tooth gaps between the teeth to be produced are incrementally deepened. During the rough cuts, the tooth gaps are deepened with significant material removal until shortly before the final dimension is reached. The precision machining in the form of a finishing cut is subsequently carried out with reduced material removal and a reduced advance. During this finishing cut, both tooth flanks of a tooth gap can be simultaneously machined, wherein the machining point initially migrates over the left tooth flank in an inwardly rolling fashion and subsequently over the right tooth flank in an outwardly rolling fashion.

DE 10 2013 109 981 A1 describes a similar method, in which two successive finishing cuts are produced, wherein the left tooth flank is machined during an inwardly produced first finishing cut and the right tooth flank is then machined during an outwardly produced finishing cut after the phase position between the workpiece spindle rotation and the tool spindle rotation has been changed.

SUMMARY

The invention is based on the objective of disclosing a corresponding method that enhances the tooth flank quality, as well as a suitable device for use in this method.

This objective is attained with the invention disclosed in the claims. The dependent claims not only represent advantageous enhancements of the coordinate claims. The individual dependent claims rather also represent independent inventive concepts.

Initially, it is essentially proposed that the precision machining is carried out in the form of two successive finishing cuts, wherein only the left tooth flank is respectively machined during a first finishing cut and only the right tooth flank is respectively machined during a second finishing cut. The right tooth flank remains unmachined during the first finishing cut and the left tooth flank remains unmachined during the second finishing cut. According to the invention, both finishing cuts are produced in such a way that both finishing cuts are produced in the form of an inwardly rolling cut. The contact point of the respective cutting edge of the cutting tooth of the cutting wheel on the respective tooth flank of the tooth of the workpiece gear migrates inward, i.e. from the tip of the tooth of the gearing toward the root of the tooth of the gearing, during the first finishing cut, as well as during the second finishing cut. The two different tooth flanks are preferably machined with two different cutting wheels that have mirror-symmetrical shapes. Each cutting wheel may be rotationally driven by a tool spindle assigned thereto. However, the two cutting wheels may also be realized in the form of a combination tool and rotationally driven by a single tool spindle. In this case, the two cutting wheels lie axially behind one another. The rotating direction of the workpiece spindle is preferably reversed between the first and the second finishing cut. It is furthermore advantageous to change the machining position of the cutting wheel between the first and the second finishing cut. Alternatively, the axial intersection angle between the workpiece spindle axis and the tool spindle axis may also be changed. The advance preferably takes place in the direction of the skiving motion of the cutting edges, i.e. the migrating motion of the machining point, at which the left or right cutting edge is tangent to the left or right tooth flank, during the first finishing cut, as well as during the second finishing cut. The machining of the left tooth flanks during the first finishing cut takes place with cutting teeth of the first cutting wheel. The machining of the right tooth flanks during the second finishing cut takes place with cutting teeth of the second cutting wheel. The machining steps are carried out successively.

It is preferred to use rightward and leftward angled tools, if applicable with different diameters, for machining spur-geared workpiece gears. This effectively concerns mirror-symmetrical cutting wheels, wherein it is preferred that only the tool angle directions differ with respect to their sign. The axial intersection angle remains the same. The tools are then positioned on two separate tool spindles. Alternatively, the machining position, at which the cutting wheel engages on the workpiece gear, may also be offset by 180°—referred to the workpiece spindle axis. The absolute values of the axial intersection angle and the tool helix angle may differ in the production of helically geared workpiece gears. However, the first cutting wheel and the second cutting wheel generally feature oppositely directed, angularly extending cutting teeth. In a particularly preferred embodiment, it is proposed that the rough cuts can be produced with any of the two cutting wheels. In the successive machining of multiple workpiece gears, the first cutting wheel and the second cutting wheel are therefore used for producing the rough cuts. This preferably takes place alternately such that the rough cuts during the machining of a first workpiece gear are produced with the first cutting wheel, with which the first finishing cut is also produced. The second finishing cut is subsequently produced with the second cutting wheel, wherein the rotating direction of the workpiece gear is previously reversed such that the workpiece gear rotates in opposite rotating direction while the two finishing cuts are produced. During the subsequent machining of a second workpiece gear, the second workpiece gear is rough-machined with the second cutting wheel while maintaining the rotating direction used for producing the last finishing cut. The first finishing cut is produced with the second cutting wheel. The second finishing cut is produced with the first cutting wheel and in an opposite rotating direction of the workpiece spindle. The machining of the workpiece with the first cutting wheel preferably always takes place in a first rotating direction of the workpiece spindle. The machining of the workpiece with the second cutting wheel preferably always takes place in a second rotating direction of the workpiece spindle, which extends opposite to the first rotating direction.

The inventive device features a control unit, which is designed, particularly programmed, such that the device carries out the above-described method. For this purpose, the device features a workpiece spindle with a chuck for receiving the workpiece gear to be provided with a gearing. It also features at least one tool spindle for receiving a first cutting wheel or for receiving a combination tool. Alternatively, the device may also feature a second tool spindle for receiving the second cutting wheel. Furthermore, actuating drives and advancing drives are provided for displacing the at least one tool spindle relative to the workpiece spindle axis in the axial direction, as well as relative thereto in the direction of the axial clearance. However, the advance and the adjustment can also be realized with a corresponding displacement of the workpiece spindle. The rotary drives of the workpiece spindle and of the at least one tool spindle are synchronized with one another such that the workpiece spindle axis rotates with a fixed speed ratio to the tool spindle axis.

BRIEF DESCRIPTION OF THE DRAWINGS

An exemplary embodiment of the invention is described below with reference to the attached drawings. In these drawings:

FIG. 1 schematically shows a cutting wheel 2, which is in machining engagement with a workpiece gear 1, in the form of a top view of the workpiece gear 1, FIG. 2 shows a representation according to FIG. 1 in the viewing direction indicated by the arrow II, FIG. 3 shows the detail III of FIG. 1 in order to elucidate the migrating motion of the machining point 14 along the left tooth flank 7, FIG. 4 shows a follow-up representation of FIG. 3, in which the machining point 14 has migrated farther inward, i.e. from the tip 9 of the tooth in the direction of the root 10 of the tooth, after a rotation of the workpiece spindle 3 and the tool spindle 4 in the rotating direction D, FIG. 5 shows a follow-up representation of FIG. 4 after the cutting tooth 11 has passed through the root 10 of the tooth and the machining point 14 has migrated outward, i.e. from the root 10 of the tooth in the direction of the tip 5 of the tooth, along the right tooth flank 8, FIG. 6 shows a follow-up representation of FIG. 14, in which the machining point 14 has migrated farther outward in the direction S of the tip 9 of the tooth, FIG. 7 schematically shows a phase of the first finishing cut, in which the cutting tooth 11 moves after a machining operation according to FIGS. 3-4 out of the tooth gap 6 without machining the right tooth flank 8, FIG. 8 shows a representation according to FIG. 1 after a second cutting wheel 2' has been moved into a machining position in the gearing of the workpiece gear 1 subsequent to a first finishing cut, FIG. 9 shows a representation according to the viewing direction IX in FIG. 8, FIG. 10 shows a representation according to FIGS. 3-7, however, while producing a second finishing cut, during which the right cutting edge 13' of the cutting tooth 11' of the second cutting wheel 2' machines the right tooth flank 8 at a machining point 14 and the workpiece gear 1 rotates in a rotating direction D', which extends opposite to the rotating direction D in FIGS. 3-7, such that the machining point 14 migrates inward along the right tooth flank 8, i.e. from the tip 9 of the tooth toward the root of the tooth, FIG. 11 shows a follow-up representation of FIG. 10, in which the machining point 14 as migrated farther in the direction of the root 10 of the tooth, FIG. 12 shows a follow-up representation, in which the cutting tooth 11' moves during the second finishing cut out of the tooth gap 6 without the left cutting edge 12' acting upon the left tooth flank 7, FIG. 13 schematically shows a first exemplary embodiment of a device, in which two cutting wheels 2, 2' are respectively carried by a tool spindle 16, 16' and a workpiece spindle 15 carries a workpiece gear 1 to be provided with a gearing, FIG. 14 shows a second exemplary embodiment of the invention, in which two cutting wheels 2, 2' are seated on a tool spindle 16 in the form of a combination tool and the first cutting wheel 2 is in machining engagement, and FIG. 15 shows a representation according to FIG. 14, in which the second cutting wheel 2' is in machining engagement.

DETAILED DESCRIPTION

FIG. 13 shows a first exemplary embodiment of an inventive device. The inventive device comprises a machine tool with a machine base, on which a workpiece spindle 15 is mounted. The workpiece spindle 15 can be displaced in three directions in space by means of linear drives. Two tool spindles 16, 16' are provided and rotatable about at least one rotational axis such that an axial intersection angle α between the workpiece spindle axis 3 and the tool spindle axis 4 is adjustable. A displacement of the workpiece spindle 15 makes it possible to move the workpiece gear 1 into a machining position, in which the cutting teeth 11 of the first cutting wheel 2 can engage into the workpiece gear 1 in a machining fashion. This results in the operating position illustrated in FIGS. 1 and 2.

A tooth gap 6 between two teeth 5 of the workpiece gear 11 is incrementally deepened during several successive rough cuts. For this purpose, the workpiece spindle 15 is in a first axial clearance position of the workpiece spindle axis 3 and the tool spindle axis 4 displaced in the axial direction such that a relative advance motion V takes place, during which the cutting teeth 11 move through the workpiece gear 1 in the skiving direction. Additional rough cuts, during which the tooth gap 6 is incrementally deepened, are carried out with changed axial clearance.

During the machining operation, a left cutting edge 12 of the cutting tooth 11 initially engages on a left tooth flank 7 of the tooth 5 as the cutting tooth 11 moves into the tooth gap 6. The cutting edge 12 is in a tangent position to the tooth flank 7. The contact point, which defines a machining point 14, migrates from the tip 9 of the tooth toward the root 10 of the tooth in the form of a rolling or rotating motion such that a cut is produced inward along the arrow S in FIGS. 3 and 4.

Subsequently, the tip of the cutting tooth 11 passes through the root region of the tooth gap 6 such that the right cutting edge 13 engages on the right tooth flank 8 of the tooth 5. The contact point of the right cutting edge 13 on the right tooth flank 8 defines a machining point 14, which migrates farther in the direction from the root 10 of the tooth toward the tip 9 of the tooth during the course of the rotation D of the workpiece gear as illustrated in FIGS. 5 and 6.

A first finishing cut is produced in accordance with the illustrations in FIGS. 3 and 4 in that the left cutting edge 12 rolls on the left tooth flank 7 and the machining point 14 migrates inward from the tip 9 of the tooth toward the root 10 of the tooth. However, the outward motion of the cutting tooth 11 from the tooth gap 6 takes place without the right cutting edge 13 contacting the right tooth flank 8 as illustrated in FIG. 7. Consequently, only the left tooth flanks 7 of all teeth are initially precision-machined during this machining operation. The right tooth flanks 8 remain rough-machined.

A second cutting wheel 2' is used after the first finishing cut has been produced. This second cutting wheel may be carried by the second tool spindle 16 illustrated in FIG. 13. The workpiece gear 1 can be moved into a machining position relative to the second cutting wheel 2' by displacing the workpiece spindle 15. This results in the operating position illustrated in FIGS. 8 and 9. A second finishing cut is produced in this operating position while the workpiece spindle 3 rotates in the opposite rotating direction D'. In this case, the right cutting edge 13' of the cutting tooth 11' of the second cutting wheel 2' machines the right tooth flank 8. The right cutting edge 13' rolls/rotates over the right tooth flank 8 in such a way that the contact point of the right cutting edge 13' on the right tooth flank 8, i.e. the machining point 14, migrates inward along the arrow S in FIGS. 10 and 11, i.e. from the tip 9 of the tooth toward the root 10 of the tooth.

The right cutting edge 13' disengages from the right tooth flank 8 after the deepest engagement position has been reached. The cutting tooth 11 moves out of the tooth gap without the left cutting edge 12' contacting the left tooth flank 7. During this machining step, only the right tooth flanks 8 are invariably precision-machined over the entire circumference of the workpiece gear 1. The already precision-machined left tooth flanks 7 are not machined.

The second exemplary embodiment illustrated in FIGS. 14 and 15 features a combination tool that forms a first cutting wheel 2 and a second cutting wheel 2', wherein the two cutting wheels 2, 2' are arranged in the axial direction referred to the tool spindle axis 4. In order to prevent collisions with the clamping fixture of the workpiece gear 1, the diameter of the second cutting wheel 2', which is arranged axially behind the first cutting wheel 2, may be larger than the diameter of the first cutting wheel 2.

In a particularly preferred method, which can be carried out with one of the two devices described with reference to FIGS. 13-15, gearings are successively produced in several workpiece gears of identical design. In this case, the rough cuts are alternately produced either with the first cutting wheel 2 or with the second cutting wheel 2', wherein the workpiece spindle axis 3 and the tool spindle axis 4, 4' are respectively turned in a rotating direction D, D' assigned to the respective cutting wheel 2, 2'.

The first finishing cut is produced with the same cutting wheel 2, 2' that was also used for producing the rough cuts. The second finishing cut is produced with the respectively other cutting wheel 2, 2', wherein the workpiece spindle 15 and the tool spindle 16, 16' are then rotationally driven in the opposite rotating direction. This machining operation leads to uniform wear on both cutting wheels 2, 2'.

The preceding explanations serve for elucidating all inventions that are included in this application and respectively enhance the prior art independently with at least the following combinations of characteristics, namely:

A method, which is characterized in that only the left tooth flanks 7 are during a first finishing cut machined at a machining point 14, which migrates from the tip 9 of the tooth to the root 10 of the tooth while the skiving motion takes place, and only the right tooth flanks 8 are during a second finishing cut machined at a machining point 14, which migrates from the tip 9 of the tooth to the root 10 of the tooth while the skiving motion takes place.

A method, which is characterized in that the machining of the right tooth flanks 8 during the second finishing cut takes place with cutting teeth 11' of a second cutting wheel 2'.

A method, which is characterized in that the second cutting wheel 2' is rotationally driven by a second tool spindle 16'.

A method, which is characterized in that the first and the second cutting wheel 2, 2' are seated axially behind one another on the same tool spindle 16.

A method, which is characterized in that the rotating direction of the workpiece spindle 3 is changed and either the machining position of the cutting wheel 2, 2' or the axial intersection angle α is changed between the first and the second finishing cut.

A method, which is characterized in that the first cutting wheel and the second cutting wheel are used for producing the rough cuts in the successive machining of multiple workpiece gears.

A method, which is characterized in that the first and the second cutting wheel are alternately used for producing the rough cuts and the second finishing cut is produced with the respectively other cutting wheel 2, 2'.

A device, which is characterized in that the tool spindle 16 or a second tool spindle 16' carries a second cutting wheel 2' and the control unit 17 is designed in such a way that only the left tooth flanks 7 are during a first finishing cut machined with the first cutting wheel 2 at a machining point 14, which migrates from the tip 9 of the tooth to the root 10 of the tooth while the skiving motion takes place, and only the right tooth flanks 8 are during a second finishing cut machined with the second cutting wheel 2' at a machining point 14, which migrates from the tip 9 of the tooth to the root 10 of the tooth while the skiving motion takes place.

A device, which is characterized in that the control unit is designed/programmed such that the device operates according to a method with one of the preceding characteristics.

All disclosed characteristics are essential to the invention (individually, but also in combination with one another). The disclosure content of the associated/attached priority documents (copy of the priority application) is hereby fully incorporated into the disclosure of this application, namely also for the purpose of integrating characteristics of these documents into claims of the present application. The characteristic features of the dependent claims characterize independent inventive enhancements of the prior art, particularly in order to submit divisional applications on the basis of these claims.

The invention claimed is:

1. A method for producing a gearing having teeth and tooth gas between left and right flanks of the teeth in a workpiece gear by means of skiving, comprising:
   a first cutting wheel being seated on a first tool spindle and having first cutting teeth, the first cutting wheel is rotationally driven about a first tool spindle axis, and the workpiece gear is carried by a workpiece spindle and is rotationally driven about a workpiece axis;
   a second cutting wheel being seated on the first tool spindle or on a second tool spindle and having second cutting teeth, the second cutting wheel is rotationally driven about the first tool spindle axis or a second tool spindle axis;
   the first cutting wheel and the second cutting wheel each comprising left cutting edges and right cutting edges;
   the workpiece axis being aligned at an axial intersection angle to the first tool spindle axis or the second tool spindle axis;
   the workpiece spindle and the first tool spindle being synchronized with one another such that the workpiece axis rotates with a fixed speed ratio to the first tool spindle axis;
   the first cutting teeth engage into the workpiece gear in a machining fashion during an advance of the workpiece gear in a direction in which the teeth of the gearing extend;
   the tooth gaps are deepened during several successive rough cuts by changing an axial clearance between the first tool spindle axis and the workpiece axis;
   subsequently to rough cuts, during a first finishing cut only the left tooth flanks are machined with left cutting edges of the first cutting teeth of the first cutting wheel at a machining point, which migrates from a tip of a tooth of the workpiece gear to a root of the tooth of the work piece gear while the skiving motion takes place;
   subsequently to rough cuts, during a second finishing cut only the right tooth flanks are machined with right cutting edges of the second cutting teeth of the second cutting wheel at a machining point, which migrates from the tip of the tooth of the workpiece gear to the root of the tooth of the workpiece gear while the skiving motion takes placed; and
   the first cutting wheel and the second cutting wheel are used for producing the rough cuts in the successive machining of multiple workpiece gears.

2. The method according to claim 1, wherein the second cutting wheel is rotationally driven by a second tool spindle.

3. The method according to claim 1, wherein the first cutting wheel and the second cutting wheel are seated axially behind one another on the same tool spindle.

4. The method according to claim 1, wherein a rotating direction of the workpiece spindle is changed and either a machining position of the cutting wheel or the axial intersection angle is changed between the first finishing cut and the second finishing cut.

5. The method according to claim 1, wherein the first cutting wheel and the second cutting wheel are alternately used for producing the rough cuts and the second finishing cut is produced with the respectively other cutting wheel.

6. A device for producing a gearing in a workpiece gear by means of skiving, comprising:
   a first cutting wheel being seated on a first tool spindle and having first cutting teeth, the first cutting wheel is rotationally driven about a first tool spindle axis;
   a workpiece gear being carried by a workpiece spindle, the workpiece gear rotationally driven about a workpiece axis;
   a second cutting wheel being seated on the first tool spindle or on a second tool spindle and having second cutting teeth, the second cutting wheel is rotationally driven about the first tool spindle axis of the second tool spindle axis;
   the first cutting wheel and the second cutting wheel each comprising left cutting edges and right cutting edges;
   a control unit, controlling the workpiece spindle, the first and/or second tool spindle, and an advancing unit so that:
      the workpiece axis is aligned at an axial intersection angle to the first tool spindle axis or the second tool spindle axis;
      the workpiece spindle and the first tool spindle is synchronized with one another such that the workpiece axis rotates with a fixed speed ratio to the first tool spindle axis;

the first cutting teeth engage into the workpiece gear in a machining fashion during advance in a direction in which teeth of the gearing extend;

wherein the tooth gaps are deepened during several successive rough cuts by changing an axial clearance between the first tool spindle axis and the workpiece axis;

subsequently to rough cuts, during a first finishing cut only the left tooth flanks are machined with left cutting edges of the first cutting teeth of the first cutting wheel at a machining point, which migrates from a tip of tooth of the workpiece gear to a root of the tooth of the workpiece gear while a skiving motion takes place;

subsequently to rough cuts, during a second finishing cut only the right tooth flanks are machined with right cutting edges of the second cutting teeth of the second cutting wheel at a machining point, which migrates from the tip of the tooth of the workpiece gear to the root of the tooth of the workpiece gear while the skiving motion takes place; and wherein the first cutting wheel and the second cutting wheel are used for producing the rough cuts in the successive machining of multiple workpiece gears.

7. The device according to claim 6, wherein the first cutting wheel and the second cutting wheel are alternately used for producing the rough cuts and the second finishing cut is produced with the respectively other cutting wheel.

8. The device according to claim 6, wherein the second cutting wheel is mirror-symmetrical to the first cutting wheel.

9. The device according to claim 7, wherein the second cutting wheel is mirror-symmetrical to the first cutting wheel.

10. A device for producing a gearing in a workpiece gear by means of skiving comprising:

a first cutting wheel having a plurality of cutting teeth and a second cutting wheel having a plurality of cutting teeth, wherein the first cutting wheel is driven about a first tool spindle along a first tool spindle axis and the second cutting wheel is driven about a second tool spindle along a second tool spindle axis;

a workpiece spindle on which the workpiece gear is rotationally driven about a workpiece axis, the workpiece axis being aligned at an axial intersection angle to the first tool spindle axis and the second tool spindle axis;

a control unit for driving the workpiece spindle, first tool spindle, and second tool spindle such that a speed ratio between the workpiece spindle and the first tool spindle is constant, and a speed ratio between the workpiece spindle and the second tool spindle is constant;

wherein a left finishing cut is performed by the workpiece spindle which is movable to engage the first cutting wheel such that left cutting edges of the cutting teeth of the first cutting wheel contact the workpiece gear at a machining point that moves from a tip of a left tooth flank of the workpiece gear to a root of the left tooth flank;

wherein a right finishing cut is performed by the workpiece spindle which is movable to engage the second cutting wheel such that right cutting edges of the cutting teeth of the second cutting wheel contact the workpiece gear at a machining point that moves from a tip of a right tooth flank of the workpiece gear to a root of the right tooth flank;

wherein the right tooth flank of the workpiece gear is not contacted by the first cutting wheel during the left finishing cut, and the left tooth flank of the workpiece gear is not contacted by the second cutting wheel during the right finishing cut.

11. The device of claim 10, wherein the first tool spindle and the second tool spindle are the same spindle.

12. The device of claim 11 wherein the first cutting wheel and the second cutting wheel have different diameters.

13. The device of claim 9 wherein the first and second tool spindle axes are movable to adjust the axial intersection angle.

* * * * *

UNITED STATES PATENT AND TRADEMARK OFFICE
CERTIFICATE OF CORRECTION

PATENT NO. : 10,399,161 B2
APPLICATION NO. : 15/561455
DATED : September 3, 2019
INVENTOR(S) : Klaus Buchholz Page 1 of 1

It is certified that error appears in the above-identified patent and that said Letters Patent is hereby corrected as shown below:

In the Claims

Column 7, Claim 1, Line 50:
"tooth gas between left and right flanks of the teeth in a"
Should read:
--tooth gaps between left and right flanks of the teeth in a--

Column 9, Claim 6, Line 11:
"at a machining point, which migrates from a tip of tooth"
Should read:
--at a machining point, which migrates from a tip of a tooth--

Signed and Sealed this
Eleventh Day of February, 2020

Andrei Iancu
*Director of the United States Patent and Trademark Office*